United States Patent
Pinter et al.

(10) Patent No.: US 8,949,472 B2
(45) Date of Patent: Feb. 3, 2015

(54) DATA AFFINITY BASED SCHEME FOR MAPPING CONNECTIONS TO CPUS IN I/O ADAPTER

(75) Inventors: Shlomit S. Pinter, Haifa (IL); Leah Shalev, Zichron-Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 1053 days.

(21) Appl. No.: 12/207,561

(22) Filed: Sep. 10, 2008

(65) Prior Publication Data

US 2010/0064286 A1  Mar. 11, 2010

(51) Int. Cl.
| | |
|---|---|
| *G06F 15/16* | (2006.01) |
| *G06F 9/46* | (2006.01) |
| *G06F 15/173* | (2006.01) |
| *H04L 12/18* | (2006.01) |
| *H04L 29/08* | (2006.01) |

(52) U.S. Cl.
CPC ........ *G06F 15/17318* (2013.01); *H04L 12/185* (2013.01); *H04L 12/1881* (2013.01); *H04L 69/32* (2013.01)
USPC .......................................... 709/250; 718/102

(58) Field of Classification Search
USPC .......................................... 709/250; 718/102
See application file for complete search history.

(56) References Cited

U.S. PATENT DOCUMENTS

| | | | |
|---|---|---|---|
| 6,269,390 B1 | 7/2001 | Boland | |
| 7,346,053 B1* | 3/2008 | Leung et al. | 370/390 |
| 7,719,966 B2* | 5/2010 | Luft et al. | 370/229 |
| 7,751,394 B2* | 7/2010 | Takihiro et al. | 370/390 |
| 7,769,008 B2* | 8/2010 | Sakamoto et al. | 370/390 |
| 7,990,965 B1* | 8/2011 | Aggarwal et al. | 370/392 |
| 2002/0126671 A1* | 9/2002 | Ellis et al. | 370/390 |
| 2004/0225733 A1* | 11/2004 | Tesink et al. | 709/225 |
| 2006/0045078 A1* | 3/2006 | Kathail et al. | 370/360 |
| 2006/0195698 A1 | 8/2006 | Pinkerton et al. | |
| 2006/0221972 A1* | 10/2006 | Bhargava et al. | 370/392 |
| 2007/0005741 A1 | 1/2007 | Hwang et al. | |
| 2007/0064696 A1* | 3/2007 | Min | 370/392 |
| 2007/0070904 A1 | 3/2007 | King et al. | |
| 2008/0005352 A1 | 1/2008 | Goglin et al. | |
| 2008/0034101 A1 | 2/2008 | Tran et al. | |
| 2008/0077792 A1 | 3/2008 | Mann | |

* cited by examiner

*Primary Examiner* — Ninos Donabed
*Assistant Examiner* — Thomas Richardson
(74) *Attorney, Agent, or Firm* — Scully, Scott, Murphy & Presser, P.C.; Eyal Gilboa (57) ABSTRACT

A method, system and computer program product is disclosed for scheduling data packets in a multi-processor system comprising a plurality of processor units and a multitude of multicast groups. The method comprises associating one of the processor units with each of the multicast groups, receiving a multitude of data packets from the multicast groups, and scheduling all of the data packets received from each of the multicast groups for processing by the one of the processor units associated with said each of the multicast groups. In one embodiment, scheduling is based on affinity of both transmit and received processing for multiple connections to a processor unit. In another embodiment, a system call is provided for transmitting the same data over multiple sockets. Additional system calls may be used for building multicast group socket lists.

17 Claims, 5 Drawing Sheets

DATA AFFINITY BASED SCHEME FOR MAPPING CONNECTIONS TO CPUS IN I/O ADAPTER

BACKGROUND OF THE INVENTION

1. Field of the Invention

This invention generally relates to multi processor computer systems, and more specifically, to methods and systems for mapping connections to CPUs in I/O Adapters in multi processor computer systems.

2. Background Art

Multi processor computer systems have become commonplace in the last few years, enabling multiple concurrent processes in systems to achieve higher speed networking. These multi processor systems execute multiple application threads, which interact with remote systems, when each thread may send and/or transmit data over one or more network connections. Some part of the network processing is performed by the operating system in execution context of these application threads, while other part of the processing is performed in context of the OS kernel (more specifically, network receive processing context), not associated with any particular thread context. When the same connection is handled by different CPUs (one executing network processing in the context of an application thread and one or more additional CPUs in kernel network receive context), the overhead of interaction between these processors (for controlling access to the shared connection state) may outweigh the benefits of using multiple CPUs. Thus, one of the more challenging aspects of utilizing multiple processors in scalable way is scheduling the application threads and in-kernel network processing across processors in a way that optimizes overhead for each processor individually and collectively.

To achieve scalability, a technology known as receive side scaling (RSS) may be used. This technology allows the network load from a network controller to be balanced across multiple processors, using multiple queues of received packets, when packets belonging to the same TCP connection are always placed by the adapter into the same queue. This allows scheduling of network receive processing on multiple CPUs in a controllable way, when packets arriving on the same connection are always handled by the same CPU. In addition, thread scheduling policy may then schedule an application thread which uses a particular connection on the CPU which handles the receive traffic of that connection, which ensures that all network processing for that connection is done on the same CPU, thus avoiding the overhead of interaction between different parts of the network processing.

RSS (Receive Side Scaling) adapters distribute packets to different receive queues, to allow processing in parallel on multiple CPUs, while keeping packet ordering within each connection. When a connection is opened (once per run), it is mapped into a receive queue (associated with a CPU), according to hash value of the connection tuple using a pre-defined hash function implemented by the adapter. During the adapter receive operations, the packets are directed to the proper receive queue (CPU).

Recently, Sun Microsystems introduced to the market a 10 Gigabit multi cores network processor that can implement different mappings. They can map packets based on packet class, ternary matches, or a pre-defined hash function (this is hardware based flow classification based on L1 to L4 packet header information). With these capabilities, a mapping policy of thread affinity has been proposed. This policy produces a one-to-one correlation of receive and transmit packets across the same TCP connection. While this mapping policy has some advantages, it does not maximize reuse of CPU cache or achieve maximum efficiency of TCP handling.

SUMMARY OF THE INVENTION

An embodiment of the invention provides a method, system and computer program product for scheduling data packets in a multi-processor system comprising a plurality of processor units and a multitude of multicast groups. The method comprises associating one of the processor units with each of the multicast groups, receiving a multitude of data packets from the multicast groups, and scheduling all of the data packets received from each of the multicast groups for processing by the one of the processor units associated with said each of the multicast groups.

In one embodiment, scheduling is based on affinity of both transmit and received processing for multiple connections to a processor unit. In another embodiment, a system call is provided for transmitting the same data over multiple sockets. Additional system calls may be used for building multicast group socket lists.

An embodiment of the invention, described below in detail, provides a method and system for scheduling threads and mapping multicast groups to CPUs so that all the TCP connections belonging to a multicast group are handled on the same CPU (of both the transmit and the receive traffic). This provides a number of important advantages. For instance, this procedure allows reuse of CPU cache for holding a single copy that will be sent to all multicast members. Applications using publish/subscribe will benefit from such savings. In publish/subscribe protocols, a topic is mapped to a multicast group. Another important advantages of the preferred embodiment of the invention is that it allows efficient TCP handling without extra cache-coherency traffic for connection contexts access—for multiple connections.

Two embodiments of the invention are disclosed herein. A first embodiment is based on affinity of transmitter. In this embodiment, the mapping function is changed such that a multicast group is recognized (header level x) and all its members are mapped to connections on the same CPU, thus utilizing the sent data that is brought from the same cache. In a second embodiment, a unique system call is provided for transmitting the same data over multiple sockets. Additional system calls may be used for building "multicast group socket lists."

Further benefits and advantages of this invention will become apparent from a consideration of the following detailed description, given with reference to the accompanying drawings, which specify and show embodiments of the invention.

DETAILED DESCRIPTION OF THE PREFERRED EMBODIMETNS

Figure 1:
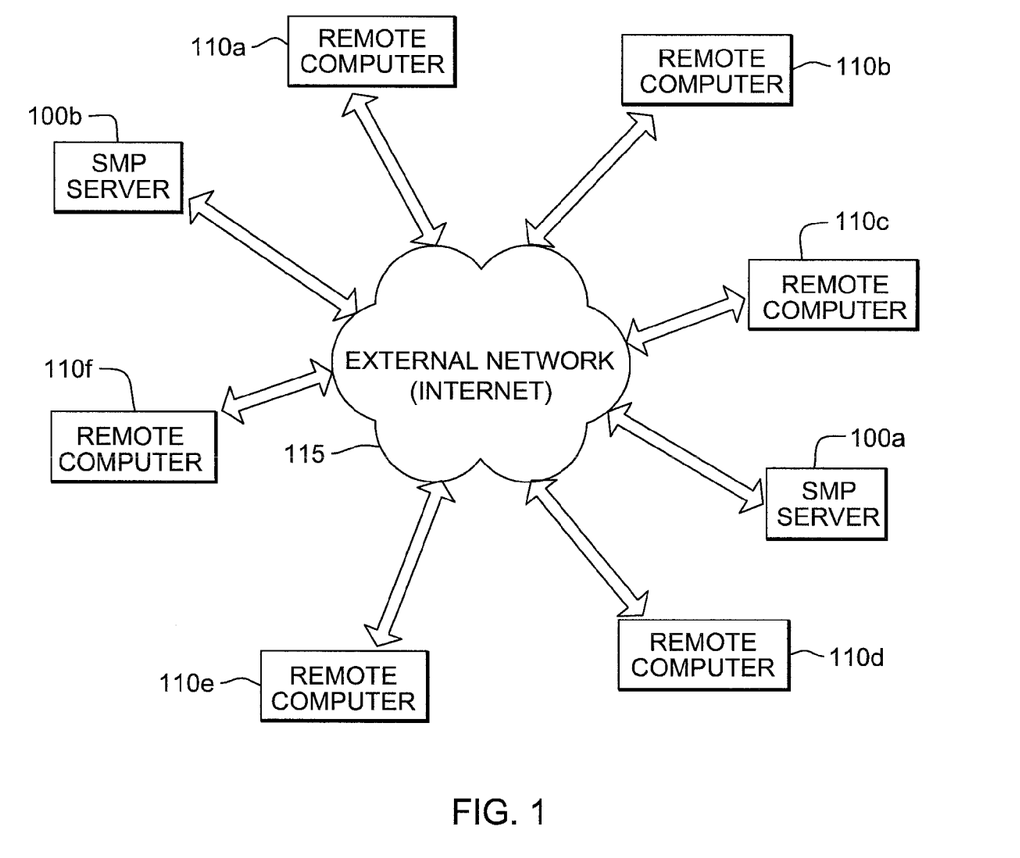
FIG. 1 is a schematic diagram of a networked computer system in which the present invention may be implemented.

FIG. 1 illustratively depicts an example of a suitable operating environment within which the invention is implemented. The example network includes several remote computers 110a-f communicating with multiprocessor systems 100a-b over a network 115. Network 115 includes many well-known components, such as routers, gateways, hubs, etc. and allows remote computers 110a-f to communicate via wired and/or wireless media.

The operating environment of FIG. 1 is only one example of a suitable operating environment and is not intended to suggest any limitation as to the scope of use or functionality of the invention. Examples of well known computing systems, environments, and/or configurations that are suitable for use with the invention include, but are not limited to, personal computers, server computers, hand-held or laptop devices, multiprocessor systems, microprocessor-based systems, network PCs, minicomputers, mainframe computers, distributed computing environments that include any of the above systems or devices, and the like, either alone or in combination.

The invention is described in the general context of computer-executable instructions, such as program modules, being executed by a system computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
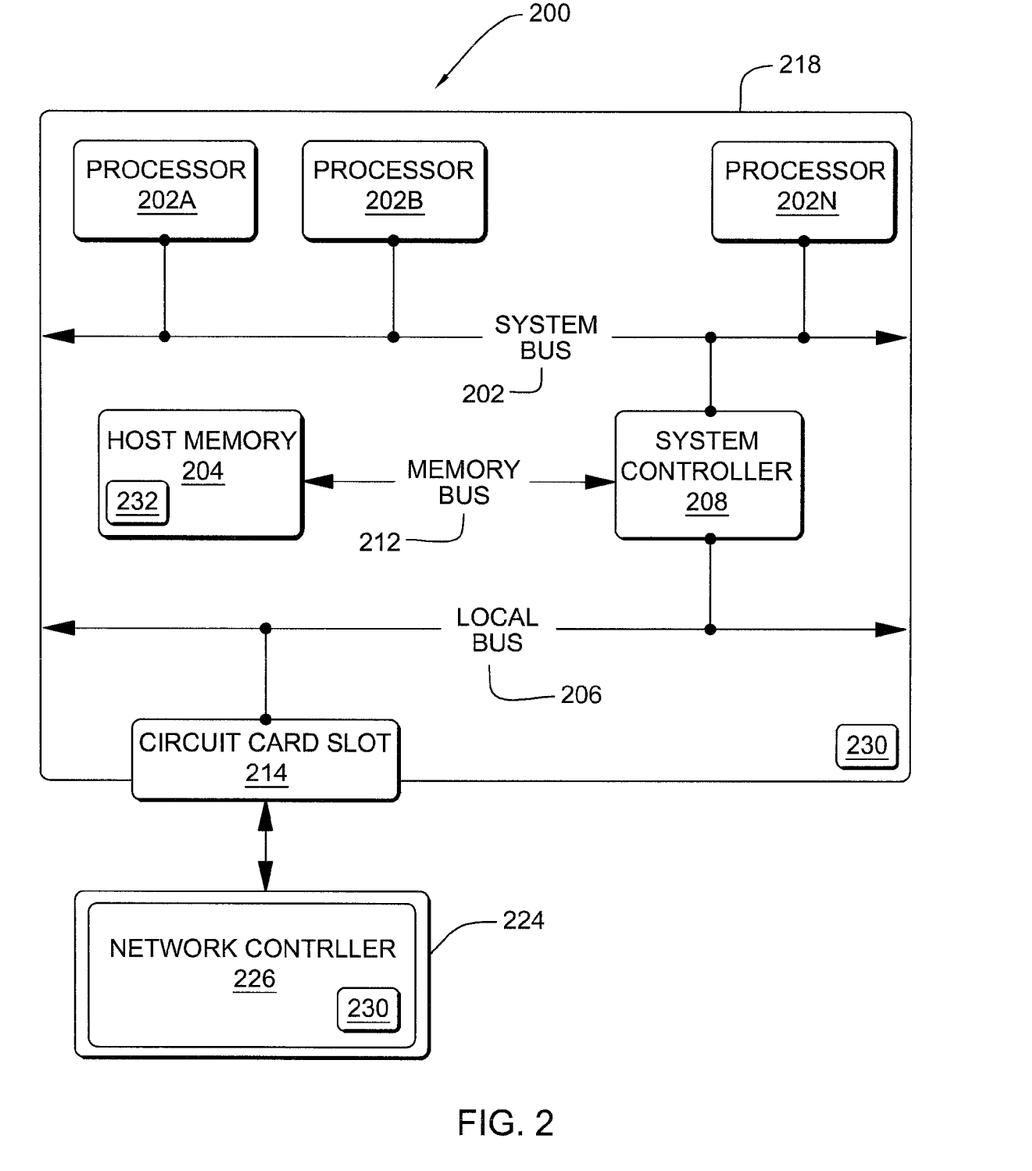
FIG. 2 illustrates a portion of a multiprocessor system incorporating the packet scheduling procedure of this invention.

FIG. 2 illustrates in more detail, a multi-processor system 200, which may be used, for example, as system 100a of network 100. System 200 may comprise one or more processors 202A, 202B, ..., 202N, host memory 204, busses 206, 210, 212, system controller 208, and network controller 226. System 200 may comprise more than one, and other types of memories, buses, and network controllers; however, those illustrated are described for simplicity of discussion. Processors 202A, 202B, ..., 202N, host memory 204, and busses 206, 210, 212 may be comprised in a single circuit board, such as, for example, a system motherboard, or in a chipset 218.

A "processor," as discussed herein, may comprise a combination of hardware and software resources for accomplishing computational tasks. For example, a processor may comprise a system memory and processing circuitry (e.g., a central processing unit (CPU) or microcontroller) to execute machine-readable instructions for processing data according to a predefined instruction set. Alternatively, a processor may comprise just the processing circuitry (e.g., CPU). A processor may comprise a multi-core processor having a plurality of computational engines. Alternatively, a processor may comprise a computational engine that may be comprised in the multi-core processor, where an operating system may perceive the computational engine as a discrete processor with a full set of execution resources.

System 200 may comprise logic 230. Logic 230 may comprise hardware, software, or a combination of hardware and software (e.g., firmware). For example, logic 230 may comprise circuitry (i.e., one or more circuits) to perform operations described herein. For example, logic 230 may comprise one or more digital circuits, one or more analog circuits, one or more state machines, programmable logic, and/or one or more ASIC's (Application-Specific Integrated Circuits). Logic 230 may be hardwired to perform the one or more operations. Alternatively or additionally, logic 230 may be embodied in machine-executable instructions 232 stored in a memory, such as memory 204, to perform these operations. Alternatively or additionally, logic 230 may be embodied in firmware. Logic may be comprised in various components of system 200, including network controller 226, processors 202A, 202B, ..., 202N, and/or on chipset 218. Logic 230 may be used to perform various functions by various components as described herein.

System controller 208 may comprise one or more integrated circuit chips, (e.g., graphics, memory, and I/O controller hub chipsets). For example, controller 208 may comprise an input/output control hub (ICH), and/or a memory control hub (MCH), although this does not limit embodiments of the invention. Controller 208 may comprise a host bridge/hub system that may couple processor 202A, 202B, ..., 202N, and host memory 204 to each other and to local bus 206. Controller 208 may communicate with memory 204 via memory bus 212 and with processors 202A, 202B, ..., 202N via system bus 210. In alternative embodiments, processor 202 and host memory 204 may be coupled directly to bus 206, rather than via controller 208.

Local bus 206 may comprise a bus that complies with the Peripheral Component Interconnect (PCI) Local Bus Specification Alternatively; for example, bus 206 may comprise a bus that complies with the PCI Express Bus Specification. Bus 206 may comprise other types and configurations of bus systems.

Network controller 226 may be comprised in a circuit card 224 (i.e., network interface card or NIC) that may be inserted into a circuit card slot 214. A "network controller" refers to a device which may be coupled to a data transmission medium to transmit data to or receive data from other devices coupled to the data transmission medium. For example, a network controller may be designed to transmit data to or receive data from devices coupled to a network such as a local area network. Such a network controller may communicate with the other devices according to any one of several data communication formats such as, for example, communication formats according to versions of IEEE Std. 802.3 (Ethernet), IEEE Std. 802.11, IEEE Std. 802.16, Universal Serial Bus, Firewire, asynchronous transfer mode (ATM), synchronous optical network (SONET) or synchronous digital hierarchy (SDH) standards. In alternative embodiments, a network controller may comprise any one of other I/O devices such as, for example, a controller to a data storage system. However, these are merely examples of a network controller and embodiments of the present invention are not limited in these respects.

Network controller 226 may also comprise logic 230 to perform operations described herein as being performed by network controller 226 and/or system 200. When circuit card 224 is inserted into circuit card slot 214, PCI bus connector (not shown) on circuit card slot 214 may become electrically and mechanically coupled to PCI bus connector (not shown) on circuit card 224. When these PCI bus connectors are so coupled to each other, logic 230 in circuit card 224 may become electrically coupled to bus 206. When logic 230 is electrically coupled to bus 206, any of processors 202A, 202B, ..., 202N may exchange data and/or commands with logic 230 via bus 206 that may permit one or more processors 202A, 202B, ..., 202N to control and/or monitor the operation of logic 230. Rather than reside on circuit card 224, network controller 226 may instead be comprised on system chipset 218. Alternatively, network controller 226 may be integrated into system controller 208.

Host memory 204 may store machine-executable instructions 232 that are capable of being executed, and/or data capable of being accessed, operated upon, and/or manipulated by logic, such as logic 230. Host memory 204 may, for example, comprise read only, mass storage, random access computer-accessible memory, and/or one or more other types of machine-accessible memories. The execution of program instructions 232 and/or the accessing, operation upon, and/or manipulation of this data by logic 230 for example, may result in, for example, system 200 and/or logic 230 carrying out some or all of the operations described herein.

Figure 3:
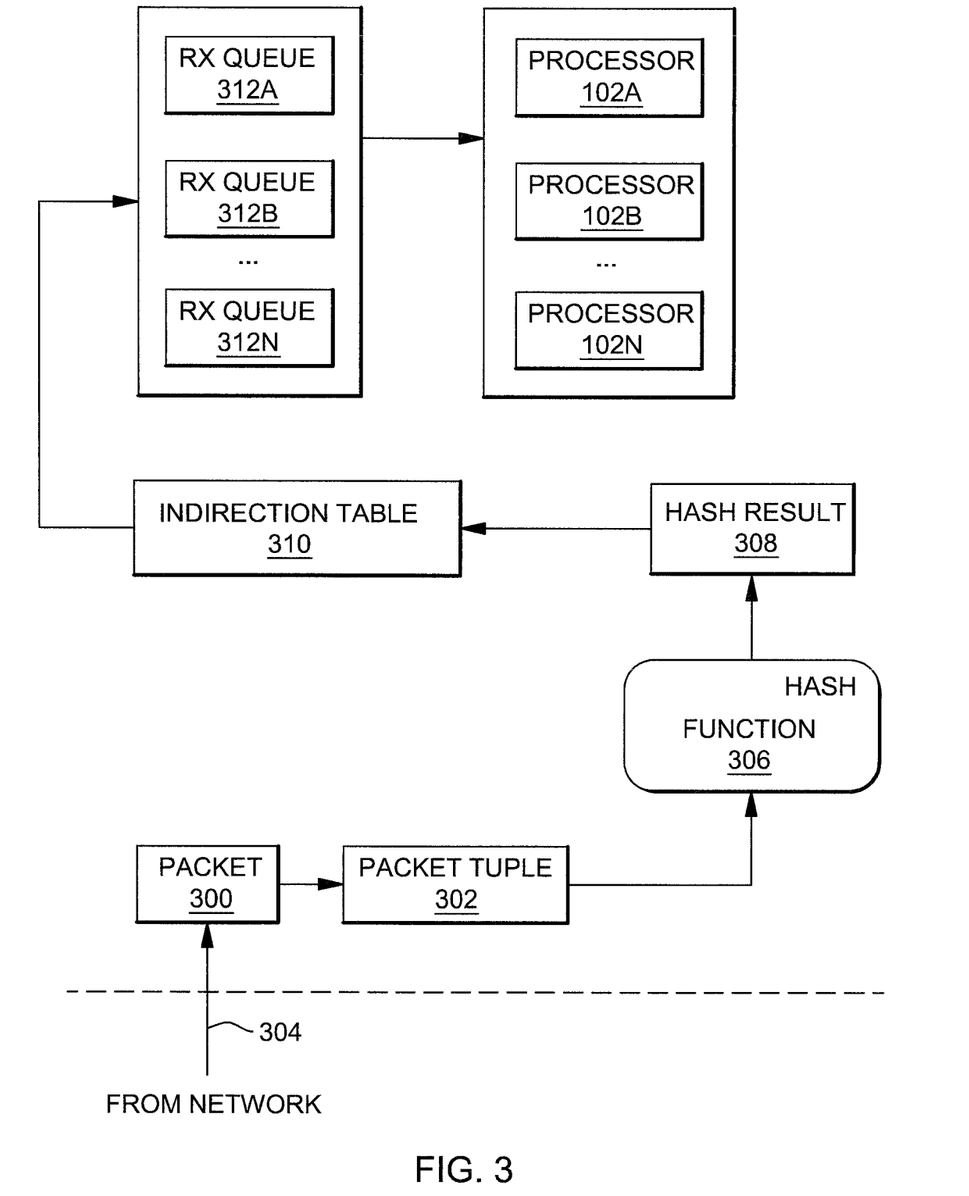
FIG. 3 shows in more detail a packet scheduling procedure.

FIG. 3 is a block diagram illustrating packet scheduling. The procedure illustrated in FIG. 3 utilizes indirection table 310, hash function 306 and receive queues 312A, 312B, . . . 312N. In the embodiment shown in FIG. 3, indirection table 310, and commutative hash function 306 may be implemented on network controller 226, and receive queues 312A, 312B, . . . , 312N may be implemented in host memory 204. However, embodiments are not limited in this respect, and other configurations may be used.

With the procedure illustrated in FIG. 3, packet 300 may be received on communication medium 304 by network controller. The network controller may examine packet 300 to obtain packet tuple 302 comprising network address identifiers (source and destination) and network port identifiers (source and destination). Network address identifier may comprise an IP (Internet Protocol) address, and network port identifier may comprise a port number to which a physical or a virtual connection may be assigned for receiving packets on the system. A hash function 306 may be performed over packet tuple 302 to generate a hash result 308. Alternatively, the network controller may examine L4 header and extract an L4 protocol-specific field to be used as a packet classification tag instead of the hash result.

Hash result 308 may be mapped to one of receive queues 312A, 312B, . . . , 312N using a mapping function or by consulting an indirection table 310. Indirection table 310 may comprise a plurality of entries, where each entry comprises a value to which hash result 308 may be mapped, and each value may correspond to an identifier of one of the receive queues 312A, 312B, . . . , 312N. Each of the receive queues 312A, 312B, . . . , 312N may correspond to one of the processors 102A, 102B, . . . , 102N, and may queue packets 300 for a corresponding one of the processors 102A, 102B, . . . , 102N.

In accordance with the present invention, a data affinity based policy is provided for mapping the threads in a reliable multicast communication. The reliable multicast communication involves transmit of the same message to multiple remote nodes, and receiving unicast messages from these nodes. Information in the L4 header is preferably utilized for this mapping.

Generally, this is done by scheduling threads and mapping multicast groups to CPUs so that all the TCP connections belonging to a multicast group are handled on the same CPU (of both the transmit and the receive traffic). This provides a number of important advantages. For instance, this procedure allows reuse of CPU cache for holding a single copy that will be sent to all multicast members. Applications using publish/subscribe will benefit from such savings. In publish/subscribe protocols; a topic is mapped to a multicast group. Another important advantage of the preferred embodiment of the invention is that it allows efficient TCP handling without extra cache-coherency traffic for connection contexts access—for multiple connections.

A first embodiment of the invention is based on affinity of transmitter. In this embodiment, the mapping function is changed such that a multicast group is recognized (header level x) and all its members are mapped to connections on the same CPU, thus utilizing the sent data that is brought from the same cache. In a second embodiment, a unique system call is provided for transmitting the same data over multiple sockets. Additional system calls may be used for building "multicast group socket lists."

Figure 4:
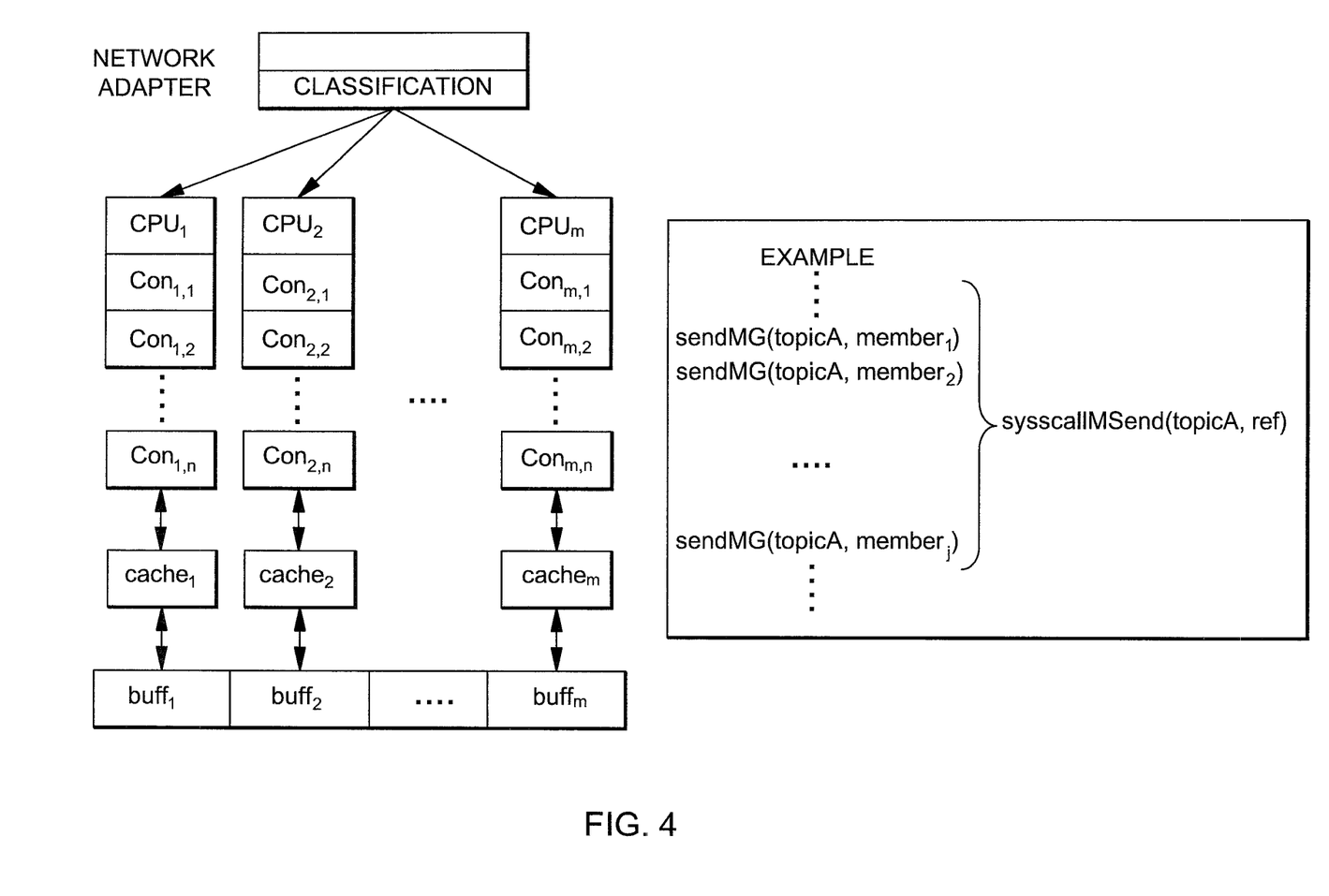
FIG. 4 is a schematic view of a network adapter that schedules packets in accordance with one embodiment of the invention.

FIG. 4 is a schematic view of the network adapter and a code example. The mapping function can be part of the I/O adapter in sync with the OS; the OS examines the map value during "connection group" creation, while the adapter performs the mapping function for each received packet. As illustrated in FIG. 4, a series of connections are assigned to each of the processors. For instance, a first series of connections $Con_{1,1}, \ldots, Con_{1,n}$ are assigned to $CPU_1$; and a second series of connections $Con_{2,1}, \ldots, Con_{2,n}$ are assigned to $CPU_2$. Each cache inherently belongs to one of the CPUs, and each buffer is accessed only by the corresponding CPU. For example, $cache_1$ belongs to $CPU_1$ and $cache_2$ belong to $CPU_2$, and $buffer_1$ is accessed only by $CPU_1$ and $buffer_2$ is accessed only by $CPU_2$.

An additional embodiment is a new system call for an efficient implementation of multicast API. This is applicable for implementation of MPI multicast, file redundancy, high availability of data (e.g., disks) etc.

Figure 5:
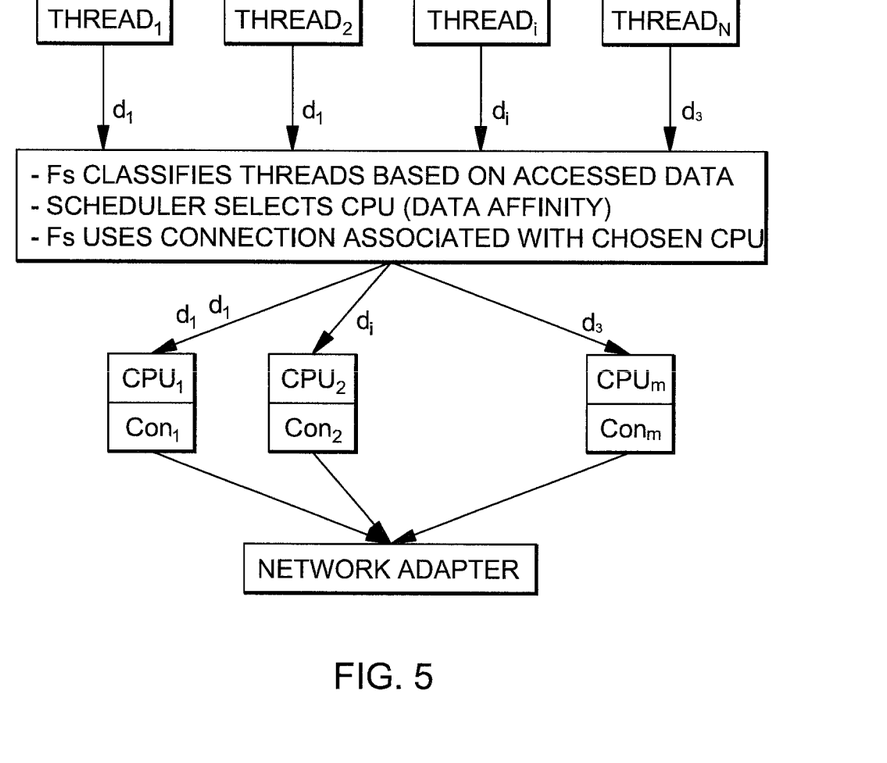
FIG. 5 illustrates a procedure for classifying threads.

As another example of utilizing data affinity, a network file system (client) communicates with the file server using several TCP connections. In this case, and with reference to FIG. 5, there are several threads that share a file on the server, and hence share the file server buffers that are sent and received over the TCP connections. In accordance with an embodiment of this invention, such threads are mapped into a single CPU and the shared buffers are transferred using the TCP connection associated with the CPU.

The following is an outline of one of the options:

mcast_create system call creates a multicast group and returns its descriptor;

mcast_ctrl system call allows to add/remove members (file descriptors) to/from the group, and configure its properties, e.g., a timeout for the mcast_write operation;

mcast_write system call specifies group descriptor, user data buffer[s], and status buffer. Alternative: status buffer location can be set in advance using mcast_ctrl call, and then any of the regular send/write/etc syscalls can be used. If the multicast group file descriptor is in non-blocking mode, the operation writes to each of the member file descriptors (which are non-blocking themselves) and returns. If the group file descriptor is set to blocking mode, the operation blocks until the write can be done on <threshold> number of members or until timeout expires. Asynchronous interfaces also can be used.

Upon call return or async completion, the status buffer contains the detailed status: array of {member_fd,actual_length,error_code}. Error code for each member is the same as what would be returned by regular write on the member fd.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the goals discussed above, it will be appreciated that numerous modifications and embodiments may be devised by those skilled in the art, and it is intended that the appended claims cover all such modifications and embodiments as fall within the true spirit and scope of the present invention.

What is claimed is:

1. A method of scheduling packets in a multi-processor system comprising a plurality of processor units, a plurality of caches, wherein each of a distinct one of the processor units is associated with each of a distinct one of the caches, a plurality of multicast groups, wherein each multicast group includes a plurality of members, and a single network adapter, the method comprising:
    associating a distinct one of the processor units with each of a distinct one of the multicast groups;
    receiving a multitude of data packets from the multicast groups via the single network adapter;
    scheduling all of the data packets received from each of the multicast groups for processing by the one of the processor units associated with said each of the multicast groups;
    handling all of a plurality of connections belonging to a given one of the multicast groups by the same one of the processor units; and
    holding a single copy of each packet in a respective one of the caches associated with the processor unit that is processing the respective packet to be sent via the single network adapter to all members of a respective multicast group;
    wherein the same data is transmitted by a single local thread to all members of a multicast group;
    wherein a plurality of connections are provided for each of the processor units, and the scheduling all of the data packets received from each of the multicast groups for processing by the one of the processor units associated with said each of the multicast groups includes mapping all of the data packets received from each of the multicast groups to the connections provided for the processor unit associated with said each of the multicast groups.

2. A method according to claim 1, wherein all of the plurality of connections belonging to a given one of the multicast groups, including both transmit and receive, are handled by the same one of the processor units.

3. A method according to claim 1, wherein the scheduling all of the data packets received from each of the multicast groups for processing by the one of the processor units associated with said each of the multicast groups includes recognizing each multicast group, and mapping all of the members of each multicast group to connections on the same processor unit.

4. A method according to claim 1, wherein the scheduling all of the data packets received from each of the multicast groups for processing by the one of the processor units associated with said each of the multicast groups includes identifying the multicast group from which each of the data packets is received.

5. A method according to claim 1, wherein the multi-processor system includes an I/O adapter for receiving the data packets, and the scheduling is done by said I/O adapter.

6. A method according to claim 1, wherein the scheduling is based on a system call for transmitting the same data over multiple sockets.

7. A method according to claim 1, wherein the scheduling of packets is performed in the context of an application using a publish/subscribe protocol.

8. A scheduling system for scheduling packets in a multi-processor system comprising a plurality of processor units, a plurality of caches, wherein each of a distinct one of the processor units is associated with each of a distinct one of the caches, a plurality of multicast groups, wherein each multicast group includes a plurality of members, and a single network adapter, the scheduling system comprising one or more of said processor units configured for:
    associating a distinct one of the processor units with each of a distinct one of the multicast groups;
    receiving a multitude of data packets from the multicast groups via the single network adapter;
    scheduling all of the data packets received from each of the multicast groups for processing by the one of the processor units associated with said each of the multicast groups;
    handling all of a plurality of connections belonging to a given one of the multicast groups by the same one of the processor units; and
    holding a single copy of each packet in a respective one of the caches associated with the processor unit that is processing the respective packet to be sent via the single network adapter to all members of a respective multicast group;
    wherein the same data is transmitted by a single local thread to all members of a multicast group;
    wherein a plurality of connections are provided for each of the processor units, and the scheduling all of the data packets received from each of the multicast groups for processing by the one of the processor units associated with said each of the multicast groups includes mapping all of the data packets received from each of the multicast groups to the connections provided for the processor unit associated with said each of the multicast groups.

9. A scheduling system according to claim 8, wherein all of the plurality of connections belonging to a given one of the multicast groups, including both transmit and receive, are handled by the same one of the processor units.

10. A scheduling system according to claim 8, wherein the scheduling includes the step of recognizing each multicast group, and mapping all of the members of each multicast group to connections on the same processor unit.

11. A scheduling system according to claim 8, wherein the scheduling all of the data packets includes identifying the multicast group from which each of the data packets is received.

12. A scheduling system according to claim 8, wherein the multi-processor system includes an I/O adapter for receiving the data packets, and the scheduling is done by said I/O adapter.

13. A scheduling system according to claim 8, wherein the scheduling of packets is performed in the context of an application using a publish/subscribe protocol.

14. A computer program product for scheduling packets in a multi-processor system comprising a plurality of processor units, a plurality of caches, wherein each of a distinct one of the processor units is associated with each of a distinct one of the caches, a plurality of multicast groups, wherein each multicast group includes a plurality of members, and a single network adapter, the computer program product comprising:
a computer usable hardware device having computer usable program code embodied therewith, the computer usable program code comprising:
computer usable program code configured for:
associating a distinct one of the processor units with each of a distinct one of the multicast groups;
receiving a multitude of data packets from the multicast groups via the single network adapter;
scheduling all of the data packets received from each of the multicast groups for processing by the one of the processor units associated with said each of the multicast groups;
handling all of a plurality of connections belonging to a given one of the multicast groups by the same one of the processor units; and
holding a single copy of each packet in a respective one of the caches associated with the processor unit that is processing the respective packet to be sent via the single network adapter to all members of a respective multicast group; wherein the same data is transmitted by a single local thread to all members of a multicast group,
wherein a plurality of connections are provided for each of the processor units, and the scheduling all of the data packets received from each of the multicast groups for processing by the one of the processor units associated with said each of the multicast groups includes mapping all of the data packets received from each of the multicast groups to the connections provided for the processor unit associated with said each of the multicast groups.

15. A computer program product according to claim 14, wherein all of the plurality of connections belonging to a given one of the multicast groups, including both transmit and receive, are handled by the same one of the processor units.

16. A computer program product according to claim 14, wherein the scheduling all of the data packets received from each of the multicast groups for processing by the one of the processor units associated with said each of the multicast groups is based on a system call for transmitting the same data over multiple sockets.

17. A computer program product according to claim 14, wherein the scheduling of packets is performed in the context of an application using a publish/subscribe protocol.

* * * * *